Jan. 9, 1945.  L. A. MAJNERI ET AL  2,366,921
BRAKE SYSTEM
Filed July 22, 1942  6 Sheets-Sheet 2
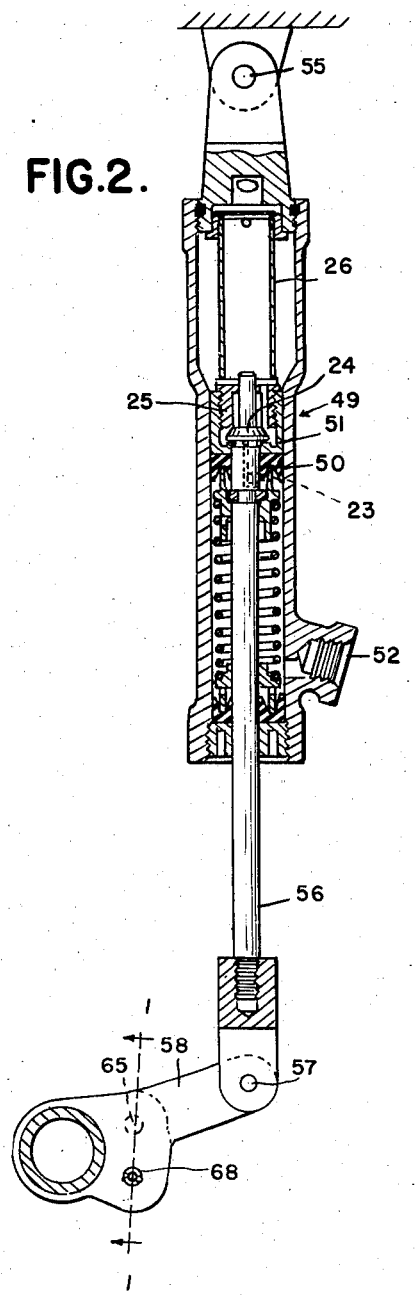
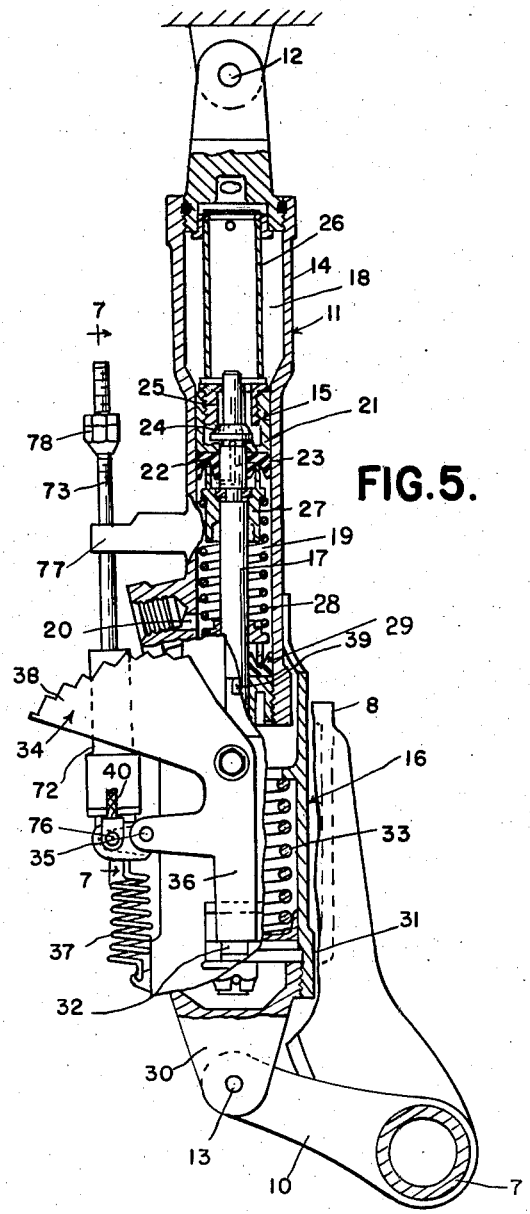
INVENTORS
LUDWIG A. MAJNERI
WILLIAM A. WISEMAN
BY
ATTORNEYS Jan. 9, 1945.   L. A. MAJNERI ET AL   2,366,921
BRAKE SYSTEM
Filed July 22, 1942   6 Sheets-Sheet 3
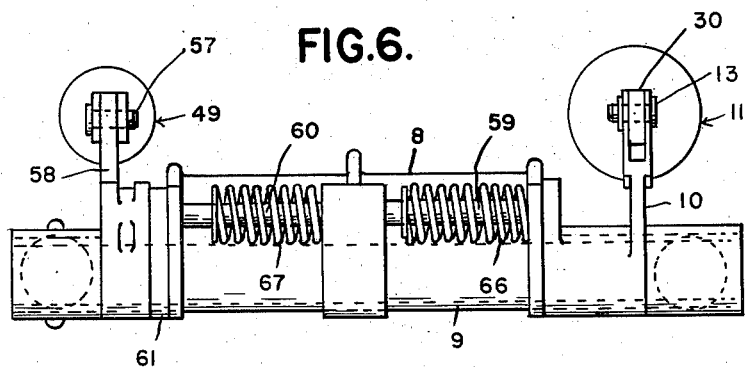
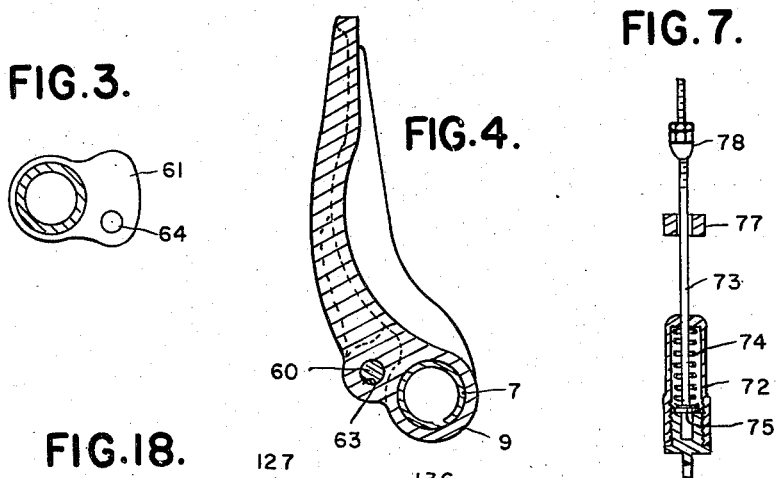
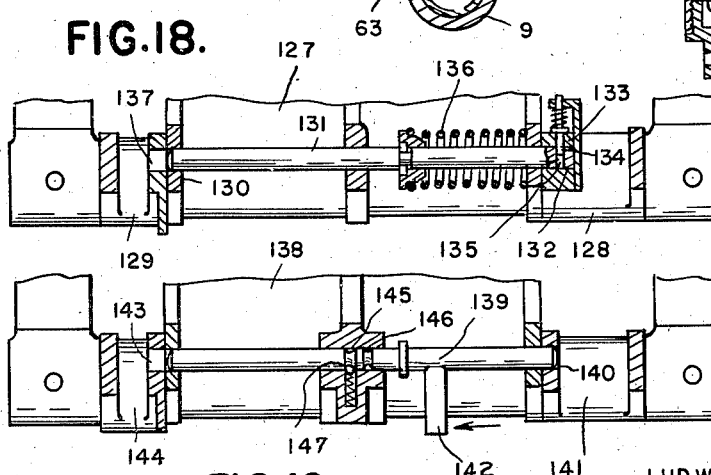
INVENTORS
LUDWIG A. MAJNERI
WILLIAM A. WISEMAN
BY
ATTORNEYS

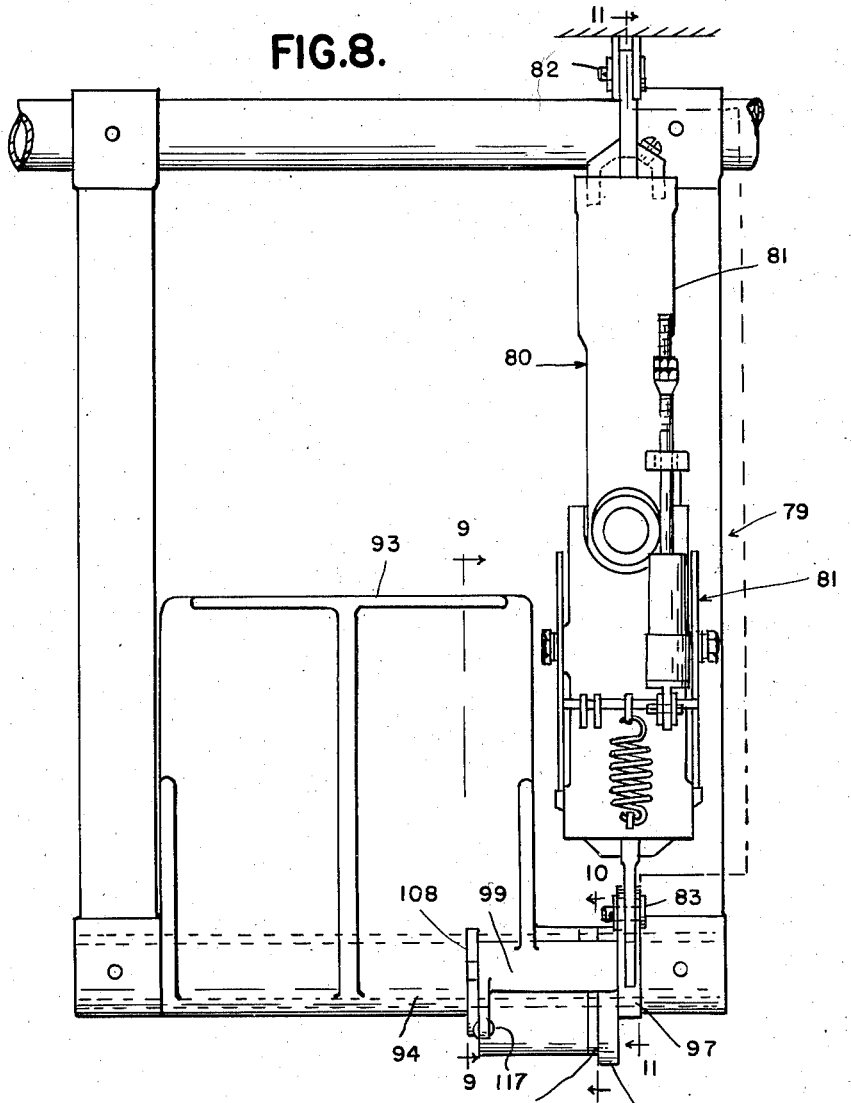
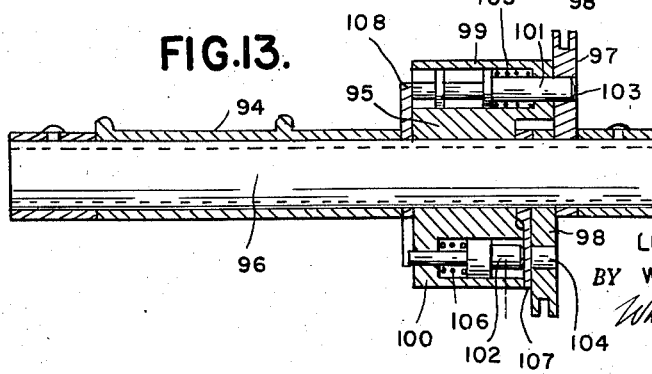

Jan. 9, 1945.    L. A. MAJNERI ET AL    2,366,921
BRAKE SYSTEM
Filed July 22, 1942    6 Sheets-Sheet 5

*INVENTORS*
LUDWIG A. MAJNERI
BY WILLIAM A. WISEMAN

ATTORNEYS

Jan. 9, 1945.　　　L. A. MAJNERI ET AL　　　2,366,921
BRAKE SYSTEM
Filed July 22, 1942　　　6 Sheets-Sheet 6

INVENTORS
LUDWIG A. MAJNERI
WILLIAM A. WISEMAN
BY

ATTORNEYS

Patented Jan. 9, 1945

2,366,921

UNITED STATES PATENT OFFICE 2,366,921

BRAKE SYSTEM

Ludwig A. Majneri, Grosse Pointe, and William A. Wiseman, Detroit, Mich., assignors to The Warner Aircraft Corporation, Detroit, Mich., a corporation of Michigan Application July 22, 1942, Serial No. 451,912

9 Claims. (Cl. 188—106)

The invention relates to brake systems and refers more particularly to hydraulic brake systems provided with emergency means for applying the brakes.

The invention has for one of its objects to provide a hydraulic brake system having separate pressure control devices for applying a brake and a manually operable member for operating the pressure control devices separately.

The invention has for another object to provide an improved operating mechanism between the service and emergency pressure control devices and the manually operable member by means of which the connection between the service pressure control device and the manually operable member is automatically broken and the connection between the emergency control device and the manually operable member is automatically made.

The invention has for a further object to so construct the operating mechanism that the automatic operations take place only in the event that the service pressure control device becomes inoperative to apply the brake as by reason of loss of braking liquid in the pressure control device or in the pressure line leading from the same to the wheel cylinder of the brake.

The invention has for other objects to provide an operating mechanism in which movable members are used to make the connections between the manually operable member and the service and emergency pressure control devices and the movements of these members are automatically controlled by an index plate; to provide a mechanism for connecting the foot pedal to the pressure control devices which can be manually controlled, and to provide a mechanism for connecting the foot pedal to the pressure control devices which can be manually operated.

These and other objects of the invention will become apparent from the following description, taken in connection with the accompanying drawings, in which Figure 1 is a front elevation, partly in section, on the line 1—1 of Figure 2 of the braking liquid pressure producing portion of the brake system and a diagrammatic view of the remaining portion of the brake system;

Figures 2, 3 and 4 are cross sections on the lines 2—2, 3—3 and 4—4, respectively, of Figure 1;

Figure 5 is a cross section on the line 5—5 of Figure 1, partly broken away;

Figure 6 is a bottom plan view of the front elevation of Figure 1;

Figure 7 is a cross section on the line 7—7 of Figure 5;

Figure 8 is a front elevation of a modified braking liquid pressure producing portion of the brake system;

Figure 1:
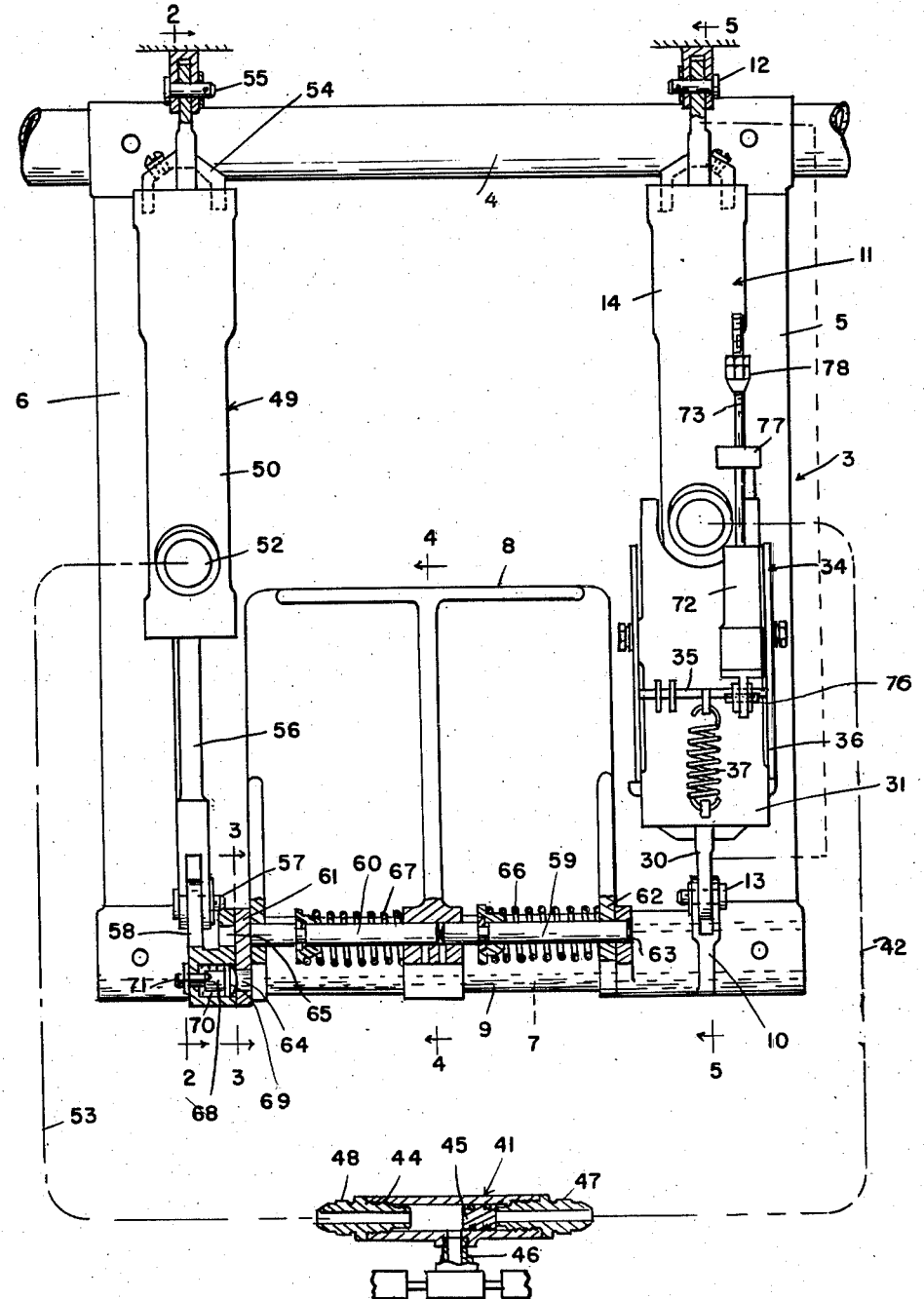
Figure 9:
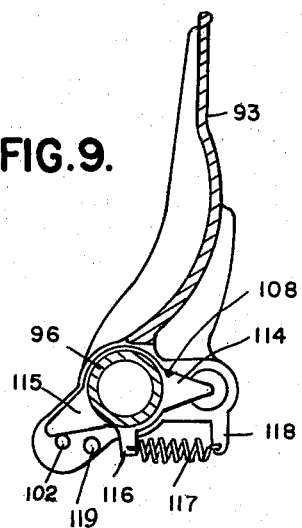
Figure 12:
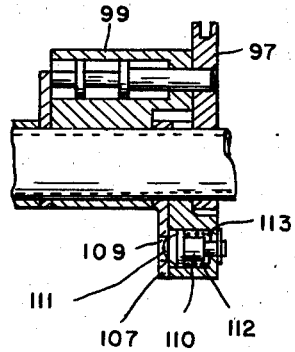
Figure 10:
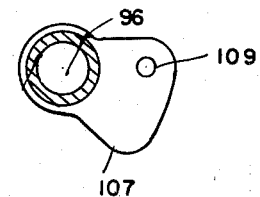
Figure 17:
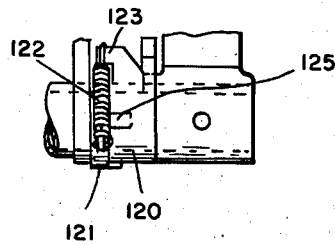
Figure 14:
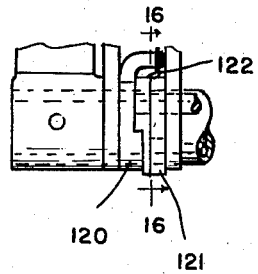
Figure 15:
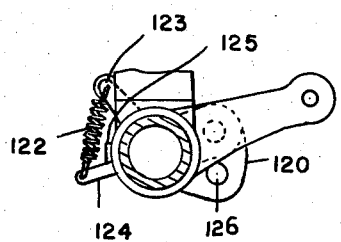
Figure 16:
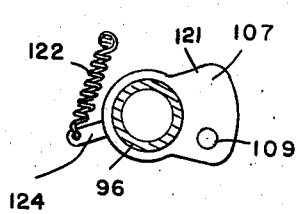
Figure 11:
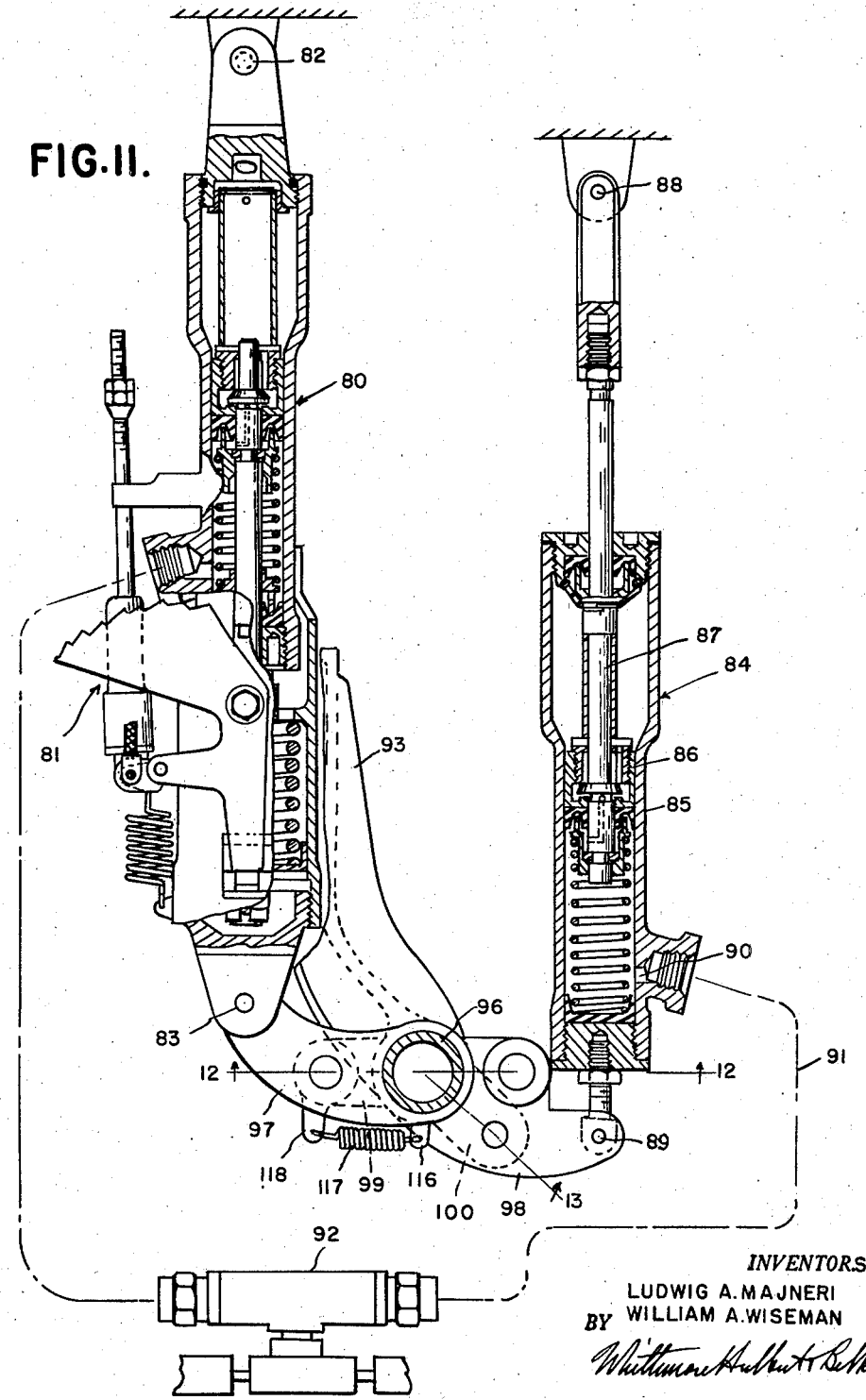

Figures 9 and 10 are cross sections on the lines 9—9 and 10—10, respectively, of Figure 8;

Figure 11 is a cross section on the line 11—11 of Figure 8, partly in section, and a diagrammatic view of the pressure line portion of the brake system;

Figure 12 is a cross section on the line 12—12 of Figure 11;

Figure 13 is a cross section on the line 12—13 of Figure 11;

Figure 14 is a view similar to a portion of Figure 1 showing a modified structure;

Figure 15 is a side elevation of Figure 14;

Figure 16 is a cross section on the line 16—16 of Figure 14;

Figure 17 is a rear elevation of Figure 14;

Figures 18 and 19 are views similar to a portion of Figure 1 showing other modified structures.

The brake system is particularly applicable to airplanes, although it is apparent that it may be used in other vehicles in which both service braking and emergency braking are desirable. In general, the brake system comprises a service pressure control device for normally applying the brake upon actuation by a manually operable member, such as a foot pedal, and an emergency pressure control device for applying the brake when the service pressure control device becomes inoperative. The emergency pressure control device is normally free of the manually operable member and is adapted to be connected to the manually operable member only upon the service pressure control device becoming inoperative.

As illustrated in Figures 1 to 7 inclusive, the brake system is for use in an airplane having the brake 1 which is adapted to be applied by the wheel cylinder 2. The brake and wheel cylinder are diagrammatically shown in Figure 1 and are of standard construction. The airplane is provided with the swingable rudder pedal 3 having the upper rod 4 rotatably mounted on the airplane, the depending side rods 5 and 6 and the lower rod 7, which latter is in the nature of a tubular shaft. The rudder pedal supports the foot pedal, the latter having at its lower end the boss 9 rotatable on the lower rod 7. 10 is an actuating lever rotatable on the lower rod 7 between the foot pedal 8 and the side rod 5 of the rudder pedal. The lever extends forwardly of the airplane from the lower rod and is operatively connected to the service pressure control device 11 which is at one side of the rudder pedal and is located forwardly of the airplane from the rudder pedal and has its axis substantially parallel to the center line of the rudder pedal. The service pressure control device is pivotally connected at its upper end by the pin 12 to the airplane and at its lower end by the pin 13 to the actuating lever 10, the arrangement being such that the rudder pedal 3, the actuating lever 10, the service pressure control device 11, and the imaginary arm between the upper rod 4 of the rudder pedal and the pivot pin 12 substantially forms a parallelogram.

The service pressure control device 11 is of standard construction and of the extension type employing yieldable parking mechanism and is generally similar to that disclosed in the L. A. Majneri Patent No. 2,120,073, patented June 7, 1938. The device comprises the cylinder 14, the piston 15 and the yieldable parking mechanism 16 which is normally inoperative, but can be manually made operative to yieldably apply the braking pressure through the piston. The cylinder has at its upper end a vented upper fitting which is pivotally connected to the airplane by the pin 12 and the cylinder has at its lower end a plug formed with an axial bore through which extends the piston rod 17. The piston is slidably secured to the upper end of the piston rod and forms a common wall for a reserve chamber 18 in the upper portion of the cylinder and a pressure chamber 19 in the lower portion of the cylinder. The cylinder is formed with the port 20 opening into the pressure chamber. The piston 15 has the upwardly facing cup-shaped body 21 and the downwardly facing sealing cup 22, the webs of which normally abut. The piston rod 17 is provided with the by-pass 23 which provides for the passage of the braking liquid past the piston 15. The piston rod is also provided with the integral valve 24 above the by-pass and adapted to seat on the web of the piston body. 25 is a downwardly facing cup-shaped nut threaded into the piston body and having the lower end of its side wall engageable with the valve 24 when the latter is raised off the web of the piston body. The upward movement of the piston is limited by the spacer 26 located in the reserve chamber 18 and when the parts are in their off position with the piston in its uppermost position, the by-pass 23 opens into both the reserve chamber 18 and the pressure chamber 19, the web of the nut 25 being provided with suitable apertures. However, upon downward movement of the piston rod relative to the piston communication is closed. To overcome possible sticking of the sealing cup 22 with the wall of the pressure chamber 19 during retraction of the piston 15 to its off position, there is the cup-shaped retainer 27 secured to the piston rod 17 and having its upper end engageable with the web of the sealing cup. The upper end of the retainer is provided with suitable radial grooves to secure a continuous communication between the reserve and pressure chambers when the parts are in their off positions.

To retain the piston 15 and the piston rod 17 in their off positions, there is the return coil spring 28 abutting the sealing cup 29 in the lower end of the pressure chamber and the retainer 27. The spring acts through the retainer upon the piston rod, which in turn acts upon the piston through the valve abutting the nut.

The yieldable parking mechanism 16 has at its lower end the lower fitting 30 which is pivotally connected by the pin 13 to the actuating lever 10. The lower fitting is secured to the lower end of the housing 31 having an axial hole in its top through which the piston rod 17 extends. 32 is a yoke sleeved on the lower end of the piston rod and held in place by a nut threaded on the lower end of the piston rod. The yoke extends through diametrically opposite slots in the housing 31. 33 is a parking coil spring within the housing and abutting its top and the yoke. To control the operation of the parking mechanism, there is a ratchet comprising like plates 34 pivotally mounted on the housing 31 at opposite sides thereof and connected by the bar 35 to swing in unison. The plates have the depending arms 36 adapted to abut the end portions of the yoke extending beyond the housing. The arms are normally held in engagement with the yoke by the ratchet return spring 37. The plates are formed with the upwardly extending teeth 38 which are engageable with the lugs 39 on the cylinder 14 when the ratchet has been swung by the cable 40 from its normal position.

The arrangement is such that with the ratchet in its normal position, at which time the arms 36 abut the yoke 32, downward pull on the lower fitting 30 to extend the service pressure control device and force braking liquid to the wheel cylinder causes downward movement of the piston 15 through the ratchet independently of the parking spring 33. However, if the ratchet is swung from its normal position to release the parking spring downward pull on the lower fitting causes the parking spring to move the piston downwardly. If the ratchet is then swung to engage its teeth 38 with the lugs 39, the housing 31 will be positively held in a lowered position with respect to the cylinder 14 and the parking spring 33 will resiliently hold the piston 15 downwardly to maintain pressure upon the braking liquid in the pressure chamber 19.

The port 20 of the service pressure control device is connected by a pressure line to the wheel cylinder 2 and, as shown, the pressure line preferably comprises the shuttle valve 41 directly connected to the wheel cylinder 2 and the tubing 42 between the port and the shuttle valve. The shuttle valve may be of standard construction and comprises the cylinder 44 and the piston 45 reciprocable in the cylinder. The cylinder has intermediate its ends the nipple 46 connected to the wheel cylinder and has at its ends the nipples 47 and 48, the former being connected to the tubing 42. The piston is adapted to occupy a position at either end of its reciprocation at which time it closes communication between the nipple 46 and one of the nipples 47 and 48 and opens communication between nipple 46 and the other of the nipples 47 and 48.

To provide for emergency application of the brake in the event that the service pressure control device becomes inoperative as by reason of loss of braking liquid in the device or in the pressure line leading from the device to the brake, an emergency pressure control device connected to the brake and automatic operating mechanism between the foot pedal and the two devices are provided.

49 is the emergency pressure control device located forwardly of the rudder pedal 3 at the side opposite the service pressure control device 11. The emergency pressure control device comprises the cylinder 50 and the piston 51 reciprocable within the cylinder. The cylinder has the port 52 adapted to be connected to the wheel cylinder 2 by a pressure line comprising the shuttle valve 41 and the tubing 53, which latter extends between the port 52 and the nipple 48 of the shuttle valve. The cylinder 50 has at its upper end a vented upper fitting 54 which is pivotally connected to the airplane by the pin 55 which is in axial alignment with the pivot pin 12. The cylinder 50 has at its lower end a plug formed with an axial bore through which extends the piston rod 56. The piston 51 and the piston rod 56 are preferably constructed and connected and resiliently held in off position in the same manner as the piston and piston rod of the service pressure control device. The lower end of the piston rod is pivotally connected to an actuating lever by the pin 57 which is in axial alignment with the pin 13. The arrangement is such that the emergency pressure control device forms part of a parallelogram identical to that of which a part is formed by the service pressure control device. The emergency pressure control device is constructed to force sufficient braking liquid under pressure into the pressure line to move the shuttle valve piston from the nipple 48 to the nipple 47 and to apply the brake 1. More in detail, the service pressure control device has a total piston travel equal to the sum of the piston travel through a normal operating range and independent of the parking spring and of the piston travel resulting from the deflection of the parking spring. The emergency pressure control device has the same total piston travel and since the effective areas of both devices are the same and the piston travel through its normal operating range is sufficient to apply the brake, the piston travel equal to that resulting from the parking spring deflection is utilized to displace the piston of the shuttle valve.

The automatic operating mechanism between the foot pedal and the two pressure control devices comprises the actuating lever 58, the spring urged pins 59 and 60, and the index plate 61. The actuating lever 58 is rotatable on the lower rod 7 of the rudder pedal between the foot pedal 8 and the side rod 6 of the rudder pedal. The lever extends forwardly of the airplane from the lower rod and is operatively connected to the emergency pressure control device 49 by the pivot pin 57. The foot pedal 8 is formed forwardly of the boss 9 with the bosses 62 in which the pins 59 and 60 are longitudinally slidable. These pins are in axial alignment and abut each other. The pin 59 is adapted to extend within the hole 63 of the actuating lever 10 to operatively connect the foot pedal 8 to the service pressure control device 11. The pin 60 is adapted to extend through the hole 64 in the index plate 61 and within the hole 65 in the actuating lever 58 to operatively connect the foot pedal 8 to the emergency pressure control device 49. The pin 59 is resiliently urged in a direction to become disengaged from the hole 63 in the actuating lever 10 by the coil spring 66 and the pin 60 is resiliently urged in a direction to enter the hole 64 in the index plate and the hole 65 in the actuating lever 58 by the coil spring 67. The index plate 61 is also rotatable on the lower rod 7 of the rudder pedal and it is located between the actuating lever 58 and the foot pedal 8. The index plate is normally held in position on the lower rod such that during normal operation of the service pressure control device with movement of its piston through a normal operating range independently of the parking spring and with corresponding movement of the foot pedal within its normal operating range, the pin 60 slides over the index plate and cannot enter the hole 64 therein. As shown, 68 is a lock pin slidably mounted in the actuating lever 58 and having the beveled nose 69 for partially entering the hole 64 in the index plate. The lock pin 68 is resiliently urged by the coil spring 70 in a direction to engage the lock pin nose in the hole 64. The coil spring 70 is of less strength than the coil spring 67 so that when the pin 60 registers with the hole 64 the coil spring 67 will force the pin 60 into the hole 64 and retract the lock pin 68. This retraction is limited by the shoulder 71 upon the lock pin engaging the bottom of the recess in which the lock pin is located and the retraction is such that the end of the pin 60 at this time is substantially flush with the face of the actuating lever 58 adjacent the index plate so that upon the return movement of the foot pedal 8, the pin will ride over the actuating lever and the index plate will be returned with the foot pedal to register the hole 64 with the hole 65, after which the pin 60 is forced by the spring 67 into the hole 65 to operatively connect the foot pedal 8 with the emergency pressure control device 49.

The foot pedal 8 is returned to its off position by the parking spring 33 and the return spring 28. The friction between the pin 59 and the actuating lever 10 resulting from the force exerted by the springs retains the pin 59 in the hole 63 while the pin 60 is entering the hole 64 and also while the foot pedal 8 is being returned until the effort of the parking spring is entirely removed and the effort of the retracting spring has decreased to a point such that the friction between the pin 59 and the actuating lever 10 is overcome by the spring 66, at which time the pin 59 breaks the connection between the foot pedal and the service pressure control device.

Inasmuch as the service pressure control device illustrated in the present case employs a parking mechanism, an automatic release mechanism for the parking mechanism must be employed to provide for the necessary movement of the foot pedal. The automatic release mechanism comprises the housing 72, the rod 73 extending axially into the housing through its upper end, and the coil spring 74 in the housing and located between its upper end and the head 75 fixedly secured to the lower end of the rod 73. The housing is pivotally connected at its lower end by the pin 76 to the ratchet and the rod 73 extends slidably through the lateral arm 77 secured to the cylinder 14. The coil spring 74 is stronger than the ratchet release coil spring 37.

78 is a nut adjustably threaded on the rod 73 above the lateral arm 77 and adapted during the extension of the service pressure control device by the actuating lever 10 to contact the lateral arm 77 shortly before the travel of the piston of the service pressure control device through its normal operating range independent of the parking spring has been completed. If the service pressure control device is operative so that there is hydraulic pressure in the brake system, a load is transmitted between the parking spring yoke 32 and the arms 36 of the ratchet tending to hold the arms in contact with the yoke to prevent the parking spring 33 from deflection. However, the complete piston travel independent of the parking spring still can be obtained because of deflection of the coil spring 74. If the service pressure control device becomes inoperative and there is no hydraulic pressure in the brake system during the extension of the service pressure control device, the ratchet release mechanism swings the ratchet to disengage the arms 36 from the yoke 32 when the piston travel independent of the parking spring has been completed. As a result, during continued extension of the service pressure control device, the parking spring 33 is deflected.

The extension of the service pressure control device being effected by the foot pedal through the pin 59 and the actuating lever 10, it will be seen that the deflection of the parking spring 33 in the service pressure control device which provides for the full extension of the service pressure control device permits the foot pedal to swing far enough to register the pin 60 with the hole 64 at substantially the end of the full extension of the pressure control device, after which the pilot allows the foot pedal to be returned to its off position by the parking spring 33 and the return spring 23. This return through the pin 60 swings the index plate to register its hole 64 with the hole 65 in the actuating lever 58 so that the pin 60 is moved by its spring 67 to operative position. At the same time, during the return the pressure of the parking spring 33 is first removed and then the pressure of the retracting spring 28 is decreased until a point is reached when the strength of the coil spring 66 is sufficient to move the pin 59 out of the hole 63 in the actuating lever 10 to inoperative position. Therefore, at the end of the return stroke of the foot pedal 8, the connection between the foot pedal and the service pressure control device 11 has been broken and the connection between the foot pedal and the emergency pressure control device 49 has been made. As a result, movement of the foot pedal 8 in a forward direction to apply the brake results in the extension of the emergency pressure control device only.

To return the parts to their original positions, the foot pedal 8 must be in the off position. A resetting pin of considerably smaller diameter than the hole 65 in the actuating lever 58 is forced against the exposed end of the pin 60 to return this pin and also the pin 59 against the effort exerted by the coil springs 66 and 67 to their original positions. After the pin 60 has been moved out of the hole 65 in the actuating lever 58 and the hole 64 in the index plate 61, the index plate can be manually swung slightly by reason of the smaller diameter of the resetting pin, so that the index plate can engage the end of the pin 60 and hold the pin in place upon removal of the resetting pin. Then the index plate can be manually swung to its original position at which time the lock pin 68 snaps into the hole 64.

While a service pressure control device having a parking mechanism has been shown, the brake system is designed also to employ a service pressure control device without the parking mechanism, this device having an excess reserve stroke equivalent to the parking spring deflection.

In some installations sufficient space is not available on both sides of the foot pedal for the service and emergency pressure control devices, as shown in Figures 1 to 7, inclusive. We have, therefore, provided a modified construction, as shown in Figures 8 to 13, inclusive, in which the pressure control devices are mounted on the same side of the foot pedal with one forwardly and the other rearwardly of the airplane with respect to the rudder pedal.

The rudder pedal 79, the service pressure control device 80 and the automatic ratchet release mechanism 81 are of the same construction as previously described. The service pressure control device is pivotally connected at its upper end by the pin 82 to the airplane and is pivotally connected at its lower end to an actuating lever by the pin 83, the service pressure control device forming part of a parallelogram preferably. The emergency pressure control device 84 is located rearwardly of the airplane relative to the rudder pedal 79 and is of the compression type. The emergency pressure control device comprises the cylinder 85 and the piston 86 slidable within the cylinder and slidably connected to the piston rod 87 which is pivotally connected at its upper end by the pin 88 to the airplane. The piston 86 and the piston rod 87 are preferably constructed and connected and resiliently held in off position in the same manner as the piston and piston rod of the service pressure control device 11. The cylinder 85 is pivotally connected at its lower end to an actuating lever by the pin 89. The axis of the emergency pressure control device 84 is preferably at the same distance from the centerline of the rudder pedal 79 as the axis of the service pressure control device 80, the emergency pressure control device forming part of a parallelogram corresponding to that of which the service pressure control device is a part. The cylinder 85 has the port 90 at its lower end which is connected by the tubing 91 to the nipple of the shuttle valve 92 opposite the nipple connected to the service pressure control device 80. The shuttle valve is constructed and also connected to the airplane brake in the same manner as the shuttle valve 41.

The foot pedal 93 has at its lower end the bosses 94 and 95 rotatable on the lower rod 96 of the rudder pedal 79 and spaced longitudinally of the lower rod. 97 and 98 are actuating levers rotatable on the lower rod side by side with the actuating lever 97 next to the adjacent side rod of the rudder pedal. The actuating lever 97 extends forwardly and is operatively connected at its free end to the service pressure control device by the pin 83. The actuating lever 98 extends rearwardly and is operatively connected at its free end to the emergency pressure control device 84 by the pin 89. The boss 95 of the foot pedal has the forwardly and rearwardly extending projections 99 and 100, respectively, which are recessed to receive the pins 101 and 102, respectively. The pin 101 is adapted to extend within the hole 103 in the actuating lever 97 to make the connection between the foot pedal 93 and the service pressure control device 79 and the pin 102 is adapted to extend within the hole 104 in the actuating lever 98 to make the connection between the foot pedal 93 and the emergency pressure control device 84. 105 is a coil spring for resiliently urging the pin 101 away from the actuating lever 97 and 106 is a coil spring for resiliently urging the pin 102 toward the actuating lever 98.

For the purpose of holding the pin 102 out of the hole 104 in the actuating lever 98 and of holding the pin 101 in the hole 103 of the actuating lever 97 so that the connection between the foot pedal and the emergency pressure control device is broken and the connection between the brake pedal and the service pressure control device is made, there are the index plate 107 and the trigger plate 108. The index plate 107 is rotatable on the lower rod 96 between the projection 100 on the foot pedal boss 95 and the actuating lever 98 and is provided with the hole 109 through which the pin 102 is adapted to extend. The index plate is normally held in a predetermined relation to the actuating lever 98 to locate the hole 109 beyond the normal operating travel of the pin 102 when applying the brake through the service pressure control device 80 when the latter is operative. As shown, 110 is a lock pin slidably mounted in the actuating lever 98 and having the beveled nose 111 for partially entering the hole 109 in the index plate. The lock pin is resiliently urged by the coil spring 112 in a direction to engage the lock pin nose in the hole 109. The coil spring 112 is of less strength than the coil spring 106 so that when the pin 102 registers with the hole 109 the coil spring 106 will force the pin into the hole and retract the lock pin. This retraction is limited by the shoulder 113 upon the lock pin engaging the bottom of the recess in which the lock pin is located and the retraction is such the end of the pin 102 is substantially flush with the face of the actuating lever 98 adjacent the index plate so that upon return swing of the foot pedal the index plate 107 will be returned with the end of the pin 102 riding over the actuating lever 98 until the pin 102 and the hole 109 register with the hole 104, at which time the spring 106 forces the pin 102 into the hole 104. The trigger plate 108 is rotatably mounted on the lower rod 96 between the bosses 94 and 95 of the foot pedal and is provided at opposite sides with the arms 114 and 115 and also with the lug 116 between the arms. The trigger plate is normally held in a rotative position such that the arm 114 engages the adjacent end of the pin 101 to hold the pin in the hole 103 of the actuating lever 97 and this rotative position is determined by contact of the arm 115 with the end portion of the pin 102 extending beyond the end of the projection 100 in which this pin is located. It will be noted that the index plate normally holds the pin 102 in a position to be engaged by the arm 115. The coil spring 117 between the lug 116 and the lug 118 depending from the foot pedal normally holds the arm 115 against the end portion of the pin 102. The pin 102 has a length such that when it enters the hole 109 in the index plate the pin is located entirely within the projection 100 to clear the arm 115. As a result, the trigger plate 108 can be swung by the spring 117 so that the arm 114 clears the pin 101, at which time the arm 115 engages the stop 119 extending laterally from the projection 100.

In operation the parts are normally in the positions shown in the drawings with the index plate 107 resiliently held by the lock pin 110 in a predetermined relation to the actuating lever 98 so that during the normal operating stroke of the service pressure control device and the consequent normal operating travel of the foot pedal, the pin 102 cannot register with the hole 109 in the index plate. Also, the pin 101 is held in the hole 103 in the actuating lever 97 by the arm 114 of the trigger plate 108, the other arm 115 of the trigger plate being in contact with the end portion of the pin 102 held in this position by the index plate 107. Thus with the service pressure control device operative, forward swinging of the foot pedal applies the brake without deflection of the parking spring of the service pressure control device.

If the service pressure control device becomes inoperative and the foot pedal is swung forwardly from its off position, it extends the service pressure control device through the pin 101 and the actuating lever 97 to bring the ratchet release mechanism into operation at the end of the normal operating travel of the piston of the service pressure control device and this release mechanism swings the ratchet out of operative relation so that continued extension of the service pressure control device deflects its parking spring. The deflection of the parking spring permits the pin 102 to register with the hole 109 in the index plate 107 and to retract the lock pin 110. The spring 117 then rotates the trigger plate 108 to contact the arm 115 with the stop 119, at which time the arm 114 clears the pin 101. The pilot then releases his foot pressure upon the foot pedal and the latter returns to its off position under the force exerted by the parking spring and the return spring of the service pressure control device, during which time the index plate 107 is swung so that at the end of the return movement of the foot pedal the hole 109 in the index plate and the pin 102 register with the hole 104 in the actuating lever 98. During the return, the pressure of the parking spring is removed and the pressure of the retracting spring of the service pressure control device decreases and a point is reached at which the spring 105 overcomes the friction between the pin 101 and the actuating lever 97 to force the pin 101 out of the hole 103. Then upon forward swinging of the foot pedal from its off position, the emergency pressure control device will be operated through the pin 102 and the actuating lever 98, during which time the service pressure control device will not be operated inasmuch as its connection with the foot pedal has been broken.

To return the parts to their original positions, the foot pedal 93 must be in off position. A suitable resetting pin is used to force the pin 101 against the effort exerted by the spring 105 into the hole 103 of the actuating lever 97, after which the trigger plate 108 is manually swung to position its arm 114 over the pin 101. While the trigger plate is held in this position, a resetting pin of considerably smaller diameter than the hole 104 in the actuating lever 98 is forced against the exposed end of the pin 102 to move the same out of the hole 104 and the hole 109 in the index plate, after which the index plate can be manually swung slightly to engage the end of the pin 102 and hold the pin in place upon removal of the resetting pin. The index plate can then be swung manually to its original position, at which time the lock pin 110 snaps into the hole 109.

Figures 14 to 17, inclusive, show another structure for normally locking the index plate to the actuating lever for the emergency pressure control device. This structure may be readily used in either of the previously described brake systems. In detail, 120 is the actuating lever pivotally connected at its free end to the emergency pressure control device and 121 is the index plate beside the actuating lever. The desired angular relation between the actuating lever and the index plate is normally retained by the coil spring 122, between the lugs 123 and 124 respectively on the actuating lever and the index plate, resiliently holding the abutment 125 on the actuating lever in contact with the lug 124. With this arrangement, after the connecting pin upon the foot pedal corresponding to the pin 60 of Figures 1 to 7, inclusive, has engaged the hole 126 in the index plate, the tension of the spring 122 must be overcome by the return spring in the service pressure control device, which spring corresponds to the return spring 28 of the service pressure control device 11, while the foot pedal is being returned to off position and carrying with it the index plate.

Figure 18 discloses another embodiment in which the connection between the foot pedal and the service pressure control device and the connection between the foot pedal and the emergency pressure control device are manually controlled. 127 is the foot pedal, 128 is the actuating lever for the service pressure control device and 129 is the actuating lever for the emergency pressure control device. The foot pedal has the bosses 130 in which is slidably mounted the pin 131. The pin is normally held positively in the hole 132 in the boss 133 of the actuating lever 128 by the spring pressed plunger 134 slidably engaging the boss and extending into the diametrical hole 135 in the pin. The plunger may be manually disengaged from the pin by pulling upon the plunger against the effort exerted by its spring. The pin 131 is resiliently urged away from the actuating lever 128 by the coil spring 136 and when moved in this direction the pin is adapted to extend within the hole 137 in the actuating lever 129 when the parts are in their off positions.

In the event that the service pressure control device becomes inoperative, the pilot pulls the plunger 134 out of the hole 135 and when the foot pedal 127 is in its off position the pin 131 is moved by the coil spring 136 into the hole 137. As a result, the connection between the foot pedal and the service pressure control device is automatically broken and the connection between the foot pedal and the emergency pressure control device is automatically made so that upon forward movement of the foot pedal it will operate the emergency pressure control device.

Figure 19 discloses another embodiment in which the connections between the foot pedal and the service pressure control device and between the foot pedal and the emergency pressure control device are respectively broken and made by a manual operation. In this structure the foot pedal 138 slidably supports the pin 139 which in normal operation extends within the hole 140 in the actuating lever 141. The pin is provided with the lateral arm 142 which can be manually moved in the direction indicated by the arrow to move the pin 139 out of the hole 140 and into the hole 143 of the actuating lever 144 for the emergency pressure control device. This movement can be accomplished only when the foot pedal is in its off position. For yieldably controlling the position of the pin 139, the pin is provided with the two annular grooves 145 and 146 which are alternatively engaged by the spring pressed ball 147 in the middle boss of the foot pedal through which the pin extends.

What we claim as our invention is:

1. In a brake system, separate pressure control devices for a brake, a manually operable oscillatable member, and operating mechanism between said manually operable member and pressure control devices for separately operating the latter from the former, said operating mechanism comprising a member normally occupying an operative position making a connection between one of said pressure control devices and said manually operable member and being movable to an inoperative position upon oscillation of said manually operable member, said operating mechanism also comprising a member normally occupying an inoperative position and being movable during the return movement of said manually operable member to an operative position making a connection between the other of said pressure control devices and said manually operable member.

2. In a brake system, a service pressure control device, an emergency pressure control device, a manually operable member, means for normally operatively connecting said service pressure control device to said manually operable member movable to a position breaking the operative connection, means for operatively connecting said emergency pressure control device to said manually operable member normally occupying a position breaking the connection, and means for effecting the movement of said first mentioned and second mentioned means to break the connection between said service pressure control device and manually operable member and make the connection between said emergency pressure control device and manually operable member.

3. In a brake system, a service pressure control device, an emergency pressure control device, a manually operable member, and automatic operating mechanism between said pressure control devices and manually operable member for separately operating the former from the latter, said operating mechanism comprising means normally making an operative connection between said service pressure control device and manually operable member and breaking the connection between said emergency pressure control device and manually operable member, and spring means for moving said first mentioned means in a direction to break the connection between said service pressure control device and manually operable member and make the connection between said emergency pressure control device and manually operable member.

4. In a hydraulic brake system, a service pressure control device for hydraulically applying a brake, an emergency pressure control device for hydraulically applying a brake, a manually operable member, a member normally in operative position to connect said service pressure control device to said manually operable member, a second member adapted to operatively connect said emergency pressure control device to said manually operable member, said second member normally occupying a position freeing said emergency pressure control device from said manually operable member, and means for normally holding said connecting members in their normal positions during the normal operating travel of said manually operable member and for releasing said connecting members upon greater travel of said manually operable member.

5. In a hydraulic brake system, a service pressure control device for hydraulically applying a brake, an emergency pressure control device for hydraulically applying a brake, a foot pedal, a pin carried by said foot pedal and normally occupying a position making an operative connection between said service pressure control device and foot pedal, a second pin carried by said foot pedal and normally occupying a position freeing said emergency pressure control device from said foot pedal, spring means for moving said pins in a direction to break the connection between said service pressure control device and foot pedal and make the connection between said emergency pressure control device and foot pedal, and an index plate for holding said pins in their normal positions during the normal operating movement of said service pressure control device and for releasing said pins upon greater movement of said service pressure control device.

6. In a hydraulic brake system, a hydraulic service pressure control device having a piston movable through a normal operating range, a hydraulic emergency pressure control device having a piston movable through a range greater than the normal operating range of the piston of said service pressure control device, actuating levers for said pressure control devices, a foot pedal, a pin carried by said foot pedal and normally engaging the actuating lever for said service pressure control device to operate the latter from said foot pedal, a second pin carried by said foot pedal and adapted to engage the actuating lever for said emergency pressure control device to operatively connect the latter to said foot pedal, an index plate for holding said pins in their normal positions during the travel of the piston of said service pressure control device within its normal operating range, said index plate being formed to permit movement of said pins from their normal positions when the travel of the piston of said service pressure control device becomes greater than the normal operating range, and means upon the actuating lever for said emergency pressure control device for normally holding said index plate in a position to retain said pins in their normal positions.

7. In a hydraulic brake system, a hydraulic service pressure control device, an emergency pressure control device, an actuating lever for said service pressure control device, a second actuating lever for said emergency pressure control device, said levers each having a hole, a foot pedal, a longitudinally movable pin upon said foot pedal normally extending within the hole of said first mentioned actuating lever to connect the same to said foot pedal, a second longitudinally movable pin upon said foot pedal in alignment with and abutting said first mentioned pin, said second pin being adapted to engage the hole in said second mentioned actuating lever to connect the same to said foot pedal, and an index plate between said second pin and second mentioned actuating lever for normally holding said first mentioned pin in engagement with said first mentioned actuating lever and said second pin out of engagement with said second mentioned actuating lever, said index plate having a hole adapted to register with said second pin upon movement of said foot pedal beyond its normal operating range and being adapted to swing to a position registering with the hole in said second mentioned actuating lever.

8. In a hydraulic brake system, a hydraulic service pressure control device, a hydraulic emergency pressure control device, an actuating lever for said service pressure control device having a hole, a second actuating lever for said emergency pressure control device having a hole, a foot pedal, a first pin upon said foot pedal engageable in the hole of said first mentioned actuating lever, a spring for normally urging said first pin away from said first mentioned actuating lever, a second pin upon said foot pedal engageable in the hole in said second mentioned actuating lever, a spring for resiliently urging said second pin into the hole in said second mentioned actuating lever, an index plate normally holding said second pin out of the hole of said second mentioned actuating lever, and a trigger plate normally positioned by said second pin to hold said first pin in the hole of said first mentioned actuating lever, said index plate having a hole engageable by said second pin upon forward movement of said foot pedal and adapted to register with the hole in said second mentioned actuating lever upon return movement by said foot pedal to permit said second pin to enter the hole in said second mentioned actuating lever.

9. In a brake system, separate pressure control devices for applying a brake, a foot pedal, actuating levers at opposite sides of said foot pedal for said pressure control devices, each of said levers having a hole, a pin upon said foot pedal engageable in the holes of said actuating levers, a manually operable member for holding said pin in the hole of one of said actuating levers, and spring means for resiliently urging said pin into the hole of the other of said actuating levers upon release of said pin by said manually operable member.

LUDWIG A. MAJNERI.
WILLIAM A. WISEMAN.